(12) United States Patent
Keller et al.

(10) Patent No.: US 7,607,835 B2
(45) Date of Patent: Oct. 27, 2009

(54) LINEAR GUIDE DEVICE WITH PRELOAD-ADJUSTMENT DEVICE

(75) Inventors: Bernhard Keller, Kaisten (DE); Roland Hoherz, Kuetzberg (DE)

(73) Assignee: Robert Bosch GmbH, Stuttgart (DE)

( * ) Notice: Subject to any disclaimer, the term of this patent is extended or adjusted under 35 U.S.C. 154(b) by 338 days.

(21) Appl. No.: 11/669,610

(22) Filed: Jan. 31, 2007

(65) Prior Publication Data

US 2007/0189647 A1 Aug. 16, 2007

(30) Foreign Application Priority Data

Feb. 15, 2006 (DE) .................. 10 2006 007 068

(51) Int. Cl.
*F16C 29/12* (2006.01)
(52) U.S. Cl. ...................... 384/40; 74/89.32
(58) Field of Classification Search ................... 384/40, 384/43–45, 54, 57; 188/28, 43, 44, 56; 74/89.32, 74/89.36; 248/298.1, 424, 429
See application file for complete search history.

(56) References Cited

U.S. PATENT DOCUMENTS

| 5,484,210 A | 1/1996 | Gallone |
| 5,829,885 A * | 11/1998 | Scheich ................ 384/45 |
| 6,629,584 B1 | 10/2003 | Mueller |
| 2002/0009241 A1 * | 1/2002 | Kahl ...................... 384/57 |
| 2007/0189646 A1 * | 8/2007 | Koeniger et al. ........... 384/45 |

FOREIGN PATENT DOCUMENTS

| DE | 43 01 434 | 7/1994 |
| DE | 295 13 452 | 10/1995 |
| DE | 298 19 265 | 1/1999 |
| DE | 601 02 959 | 4/2005 |
| EP | 0 653 574 | 5/1995 |
| EP | 1 129 814 | 9/2001 |
| JP | 03117717 A * | 5/1991 |
| WO | 01/34990 | 5/2001 |

* cited by examiner

*Primary Examiner*—Richard W L Ridley
*Assistant Examiner*—Phillip Johnson
(74) *Attorney, Agent, or Firm*—Michael J. Striker

(57) ABSTRACT

A linear guide device has a guide rail system with at least one guide rail, a guide carriage guided on the guide rail system in a guidance direction and including a base unit and legs which partially enclose the guide rail system, the guide carriage being provided with at least one preload-adjustment device via which a preload of the legs of guide carriage against the guide rail system is adjustable, the preload-adjustment device including at least one rod having one end hingedly mounted on one of the legs of the guide carriage and the other end displaceable in a displacement direction, and a displacement device for displacing the other end of the preload adjustment, device in the displacement direction.

9 Claims, 5 Drawing Sheets

LINEAR GUIDE DEVICE WITH PRELOAD-ADJUSTMENT DEVICE

CROSS-REFERENCE TO A RELATED APPLICATION

The invention described and claimed hereinbelow is also described in German Patent Application DE 10 2006 007 068 filed on Feb. 15, 2006. This German Patent Application, whose subject matter is incorporated here by reference, provides the basis for a claim of priority of invention under 35 U.S.C. 119(a)-(d).

BACKGROUND OF THE INVENTION

The present invention generally relates to linear guide devices with a preloaded-adjustment devices.

More particularly, the present invention relates to a linear guide device which includes a guide rail system with at least one guide rail, and a guide carriage which is guided on the guide rail system in the guidance direction, with a base unit and legs which partially enclose the guide rail system; the guide carriage includes at least one preload-adjustment device, via which a preload on the legs of guide carriage against the guide rail system can be adjusted.

A linear guide device of this type is made known, e.g., in U.S. Pat. No. 5,484,210, which is the closest related art. With the known linear guide device, the preload of the legs of the guide carriage against the guide rail system can be adjusted by the fact that, by displacing a wedge or rotating a shaft which is shaped accordingly, a leg section of the guide carriage is deformed elastically in the direction toward the guide rail system. The disadvantage of this is that the preload adjustment is not sensitive enough. In particular, when a screw is used to displace the wedge element, the screw-down torque of the screw provides little indication of the current preload.

SUMMARY OF THE INVENTION

Accordingly, it is an object of the present invention to improve a generic linear guide device such that a more sensitive preload adjustment is made possible and an assembler can easily find the desired state with minimal preload.

To attain this object, the present invention provides a linear guide device, which includes a guide rail system with at least one guide rail, and a guide carriage which is guided on the guide rail system in a guidance direction, with a base unit and legs which partially enclose the guide rail system; the guide carriage includes at least one preload-adjustment device, via which a preload on the legs of guide carriage against the guide rail system can be adjusted, characterized by the fact that the preload-adjustment device includes at least one rod, one end of which is hingedly mounted on a leg of the guide carriage, and the other end of which is displaceable in a displacement direction using a displacement device.

This inventive preload-adjustment device has the advantage that small preload paths can be attained using relative long displacement paths. This translation of long displacement paths into small preload paths also results in sensitive preload adjustment. In terms of the sensitivity of the preload adjustment, it is also advantageous when the individual components of the preload-adjustment device are designed to be as stiff as possible. With the inventive preload-adjustment device, due to the rod which is hingedly connected to a leg of the guide carriage, virtually no bending forces occur in the components involved, and deformations are minimized as a result.

The rod preferably extends at an angle of approximately 0° to 45° relative to a transverse direction of the guide rail system—which extends orthogonally to the guidance direction—so that, when the preload-adjustment device is displaced, the largest force component possible can be exerted on the leg of the guide carriage in the direction toward the guide rail system.

Preferably, it can also be provided that the displacement device includes an engagement part, on which the other end of the rod is hingedly mounted. An engagement part of this type makes it possible for the displacement device and the rod to engage easily.

It can also be provided that the displacement device includes a screw which bears against the base unit of the guide carriage or against the engagement part and engages in a thread formed in the engagement part or the base unit of the guide carriage. A screw makes it possible to adjust the desired preload as easily as possible, since, when tightening the screw, the assembler feels the torque increase considerably as soon as the guide transitions from the state with play to the preloaded state. By providing a separate engagement part, it is also possible to connect the screw with the rod particularly easily.

With a preferred embodiment of the inventive linear guide device, a second rod can be provided between the engagement part and the base arm, which forms a knee joint together with the first rod and the engagement part. A knee joint of this type, which bears at both ends against the guide carriage, is particularly stable and ensures a particularly good transfer of force by the preload-adjustment device.

It can also be provided that the one rod and/or the second rod and/or the engagement part are designed integral with the guide carriage, by way of which the guide carriage—which is manufactured, e.g., starting with an aluminum extruded profile section—can be provided with the inventive preload-adjustment device particularly easily.

Joints are preferably formed via material reduction between the engagement part and the at least one rod and/or between the at least one rod and the leg or the base unit of the guide carriage. Joints of this type which are formed via material reduction have the advantage of being particularly easy to manufacture, while also ensuring that no bending forces occur in the rod and/or the leg of the guide carriage itself, thereby resulting in improved precision of the preload-adjustment device.

The guide rail system can include two guide rails, although linear guide devices are also feasible with which the guide rail system includes only one or more than two guide rails.

When two or more guide rails are provided, a preload-adjustment device is preferably assigned to only one of the guide rails. The advantage of this design is that installation of the guide carriage is simpler, while still ensuring that the guide carriage can be oriented with sufficient precision, given that the preload paths are within the order of magnitude of approximately 0.1 mm. For example, when the guide carriage is driven by a threaded drive unit, the elasticity of the threaded spindle can suffice to absorb the small relative extensions of the guide carriage relative to the axis of the threaded spindle via a slight bending of the threaded spindle.

With a further embodiment of the present invention, at least two preload-adjustment devices can be provided which are separated in the longitudinal direction of the guide rail system and are assigned to the same leg of the guide carriage. In this manner, parallelism errors in the tracks of the guide carriage can be compensated.

While the use of a sliding guide of the leg of the guide carriage on the guide rail system is feasible, the legs are preferably engaged with the guide rail system via at least one rolling element circuit. In this case, a rolling element circuit is an endless rolling element channel, in which rolling elements roll in a load-bearing section between the guide rail and the leg of the guide carriage and a return section, in which rolling elements are returned in an unloaded state from the end—at the rear, as viewed in the direction of motion of the rolling elements—of the load-bearing section to its front end, thereby forming a rolling element circuit.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
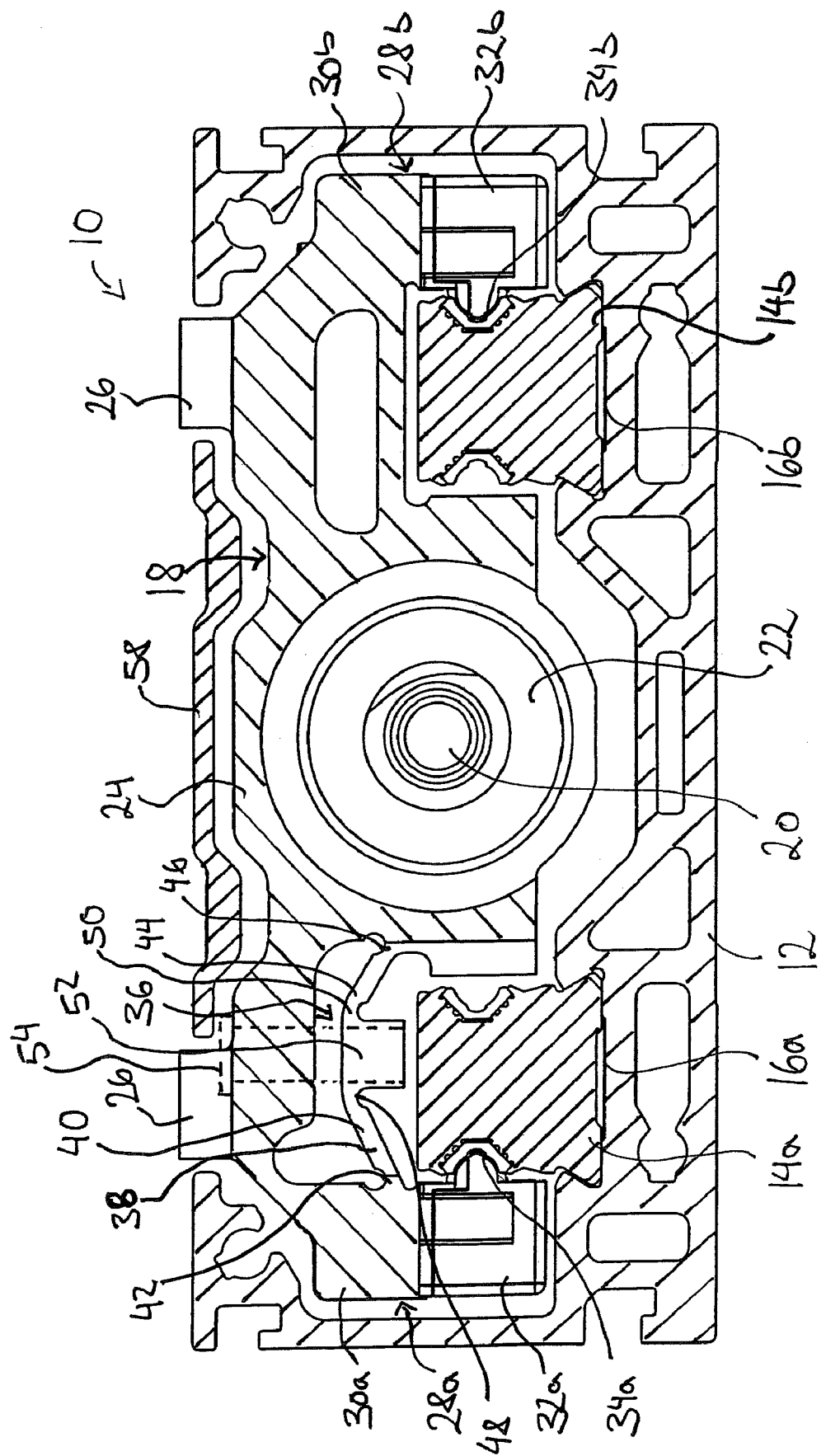
FIG. 1 shows a sectional view of an inventive linear guide device in accordance with the present invention.
Figure 2:
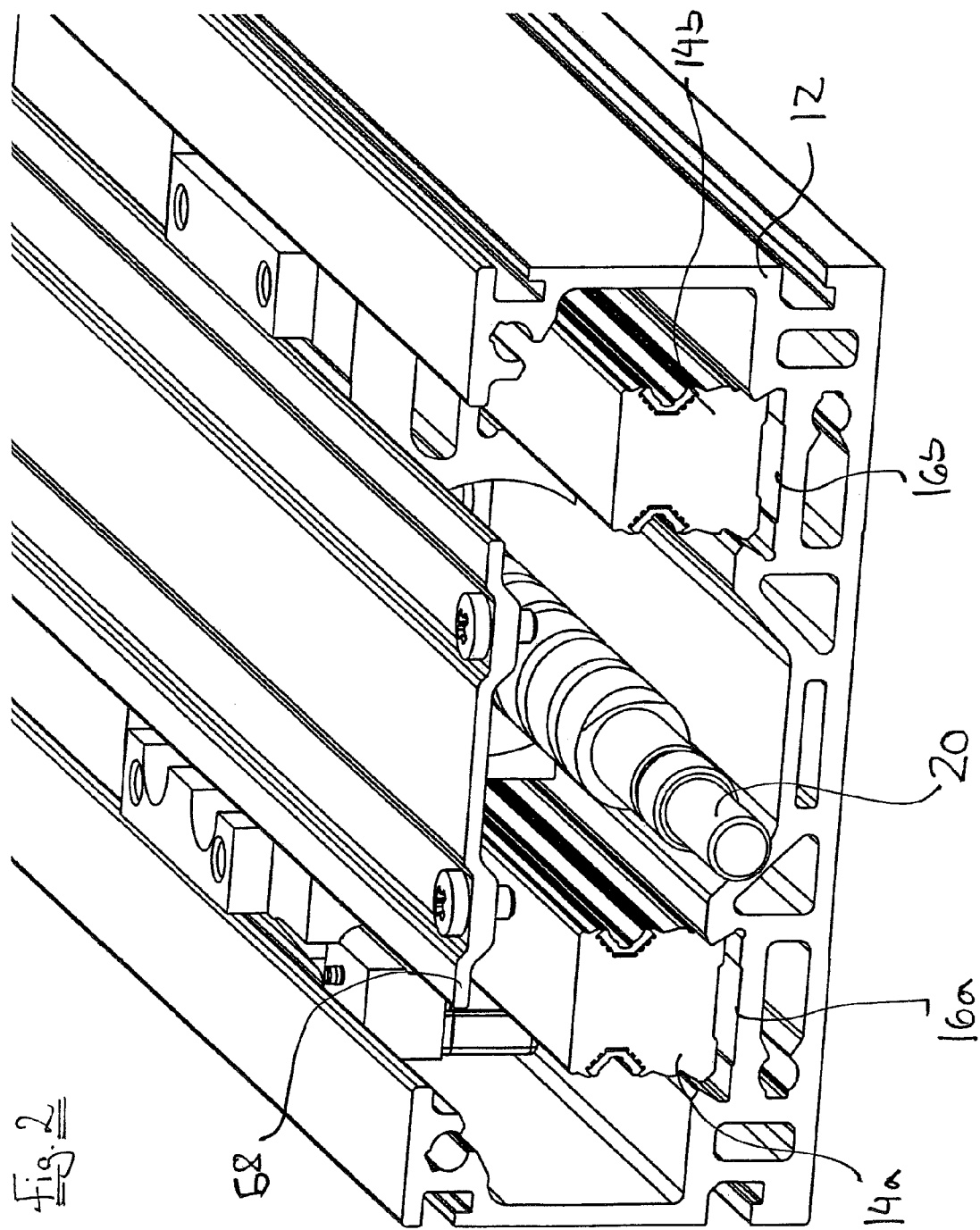
FIG. 2 is a perspective view of a guide housing with guide rails of the linear guide device in FIG. 1 in accordance with the present invention.

As shown in FIG. 1, a linear guide device 10 includes a guide housing 12, in which two guide rails 14a and 14b are fixed in position by staking a dovetail segment of guide rails 14a and 14b in grooves 16a and 16b in guide housing 12. A threaded spindle 20 is rotatably supported at the (not shown) ends of guide housing 12 to drive a guide carriage 18 which is guided in guide housing 12. A counternut 22 fastened to guide carriage 18 is engaged via threading with threaded spindle 20. A cover plate 58 is also provided, which is fastened to the ends of guide housing 12.

Guide carriage 18 includes a base unit 24 which is provided with support sections 26 for securing an object to be moved by linear guide device 10, and legs 28a, 28b, each of which laterally encloses an associated guide rail 14a, 14b and is guided on this guide rail in a guidance direction.

Each leg 28a, 28b includes a first leg section 30a, 30b which is formed integrally with base unit 24, and a rolling element circulatory group 32a, 32b mounted on this first leg section 30a, 30b. Each rolling element circulatory group 32a, 32b is engaged—via rolling bodies (not shown) guided in a load-bearing rolling element channel—with an associated guide groove 34a, 34b of associated guide rail 14a, 14b. A (not shown) rolling element return channel is formed within rolling element circulatory groups 32a, 32b, thereby providing an endless rolling element circuit. In addition, a preload-adjustment device 36 is assigned to a leg 28a of guide carriage 24.

This preload-adjustment device 36 includes a knee joint 38 which is formed integrally with first leg section 30a and base unit 24 of guide carriage 18, first rod 40 of which is hingedly connected via a joint 42 formed via material reduction on first leg section 30a of leg 28a, and second rod 44 of which is hingedly connected via a joint 46 formed via material reduction with base unit 24 of guide carriage 18. Both rods 40, 44 extend at an angle of approximately 0° to 45° relative to a transverse direction orthogonally to the guidance direction of the guide rail system. Both rods 40, 44 of knee joint 38 are interconnected via an engagement part 52; joints 48, 50 are formed via material reduction between a rod 40, 44 and engagement part 52. An adjustment screw 54—which is indicated by a dashed line in FIG. 1—bears against base unit 24 of guide carriage 18 and engages in a thread in engagement part 52.

Since grooves 16a, 16b in guide housing 12 are not machined in a material-removing manner during manufacture, the problem results that grooves 16a, 16b can be manufactured—when guide housing 12 is extruded—such that the distance between them is not accurate enough. The inaccuracy—which is due to fabrication—can be compensated by inventive preload-adjustment device 36. When adjustment screw 54 is rotated, engagement part 52 of knee joint 38 in FIG. 1 is moved upward or downward. As a result, first rod 40 of knee joint 38 pulls first leg section 30a in the direction toward associated guide rail 14a or pushes it away from it, so that a desired preload of leg 28a against associated guide rail 14a can be attained and, therefore, so that a desired preload of leg 28b against its associated guide rail 14b can be attained. Small lateral displacements of guide carriage 18 during adjustment of preload only against leg 28a are within the range of the tolerance limits of the engagement of counternut 22 with threaded spindle 20, and can also be absorbed via elastic deformation of threaded spindle 20.

The inventive principle of the knee joint for adjusting the preload of leg 28a against associated guide rail 14a has the advantage that small displacement paths of leg 28a of guide carriage 18 can be attained using relatively long displacement paths of adjustment screw 54. In this manner, the assembler feels the torque increase considerably when he screws down adjustment screw 54 as soon as the guidance of guide carriage 18 on guide rails 14a, 14b transitions from the state with play to the preloaded state. The desired state with slight preload can therefore be found easily.

The use of knee lever 38 has the further advantage that preload-adjustment device 36 becomes very stiff overall as a result, so that the increase in force that results when a preloaded state is reached takes place over a very short rotary path of adjustment screw 54. Furthermore, with knee joint 28, no bending forces occur in the participating components; as a result, the deformations of base unit 24 and leg 28a remain minimal.

Figure 3:
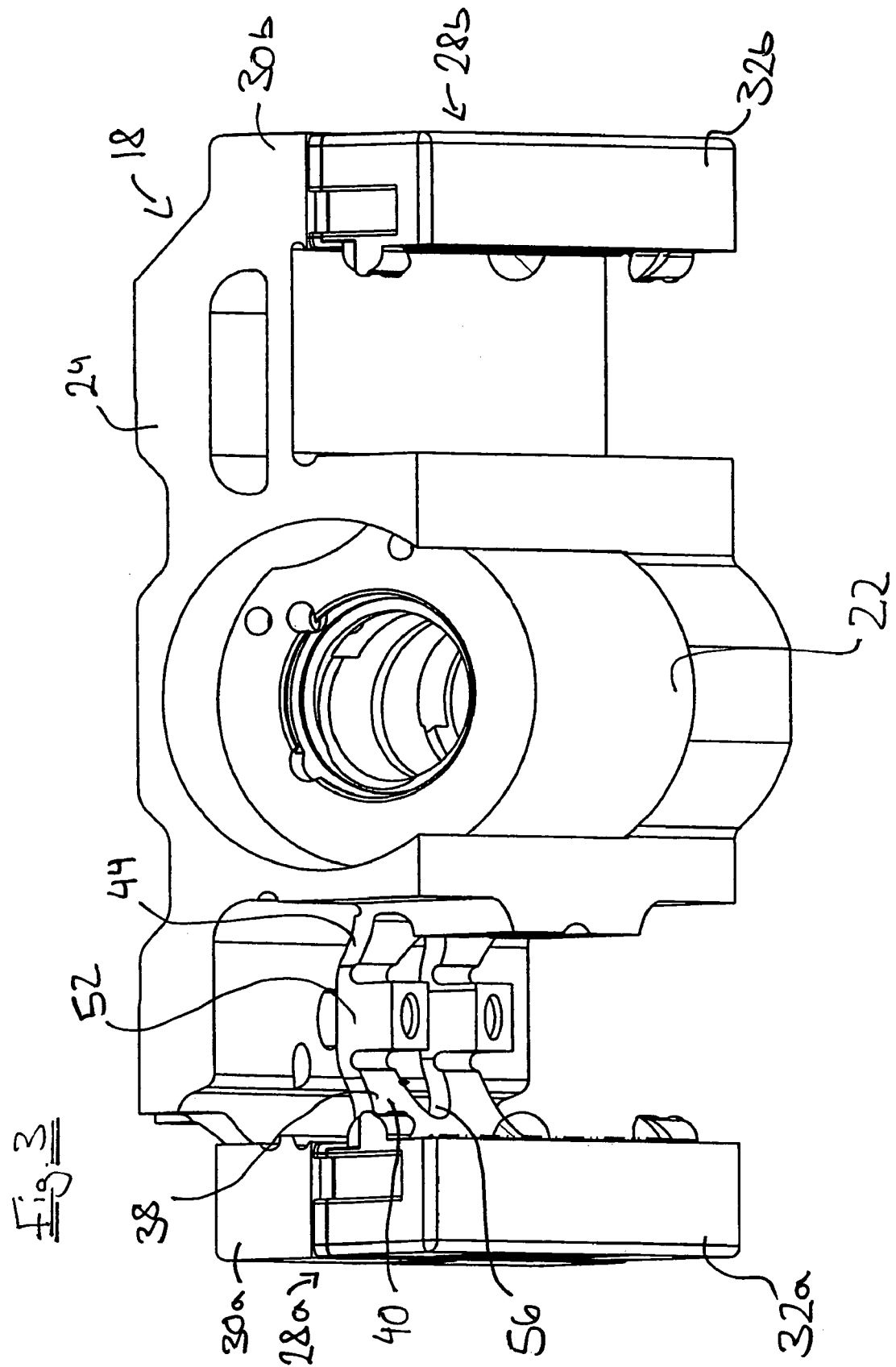
FIG. 3 is a perspective view of a guide carriage of the linear guide device in FIG. 1 in accordance with the present invention.
Figure 4:
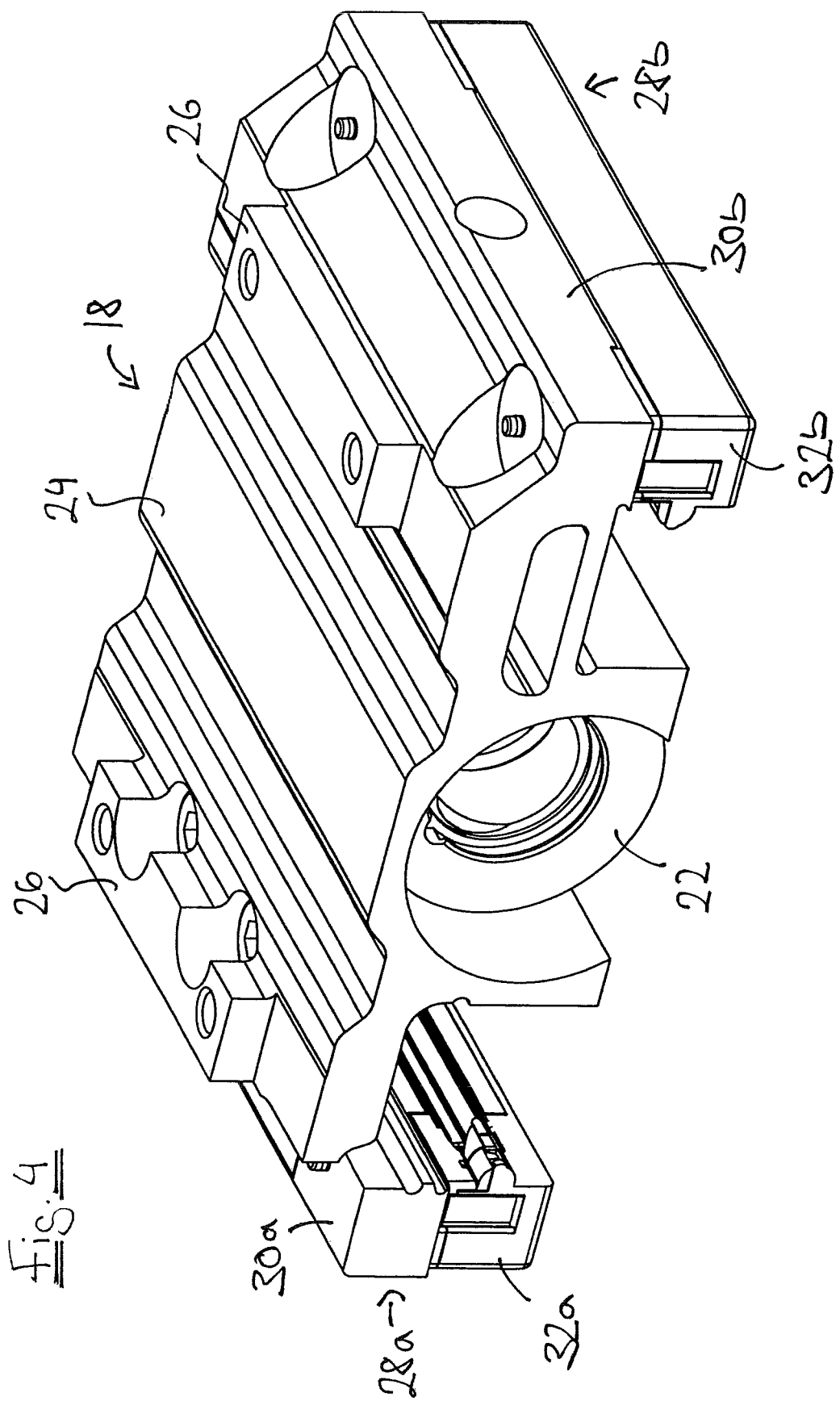
FIG. 4 is a further perspective view of the guide carriage in FIG. 3 in accordance with the present invention.
Figure 5:
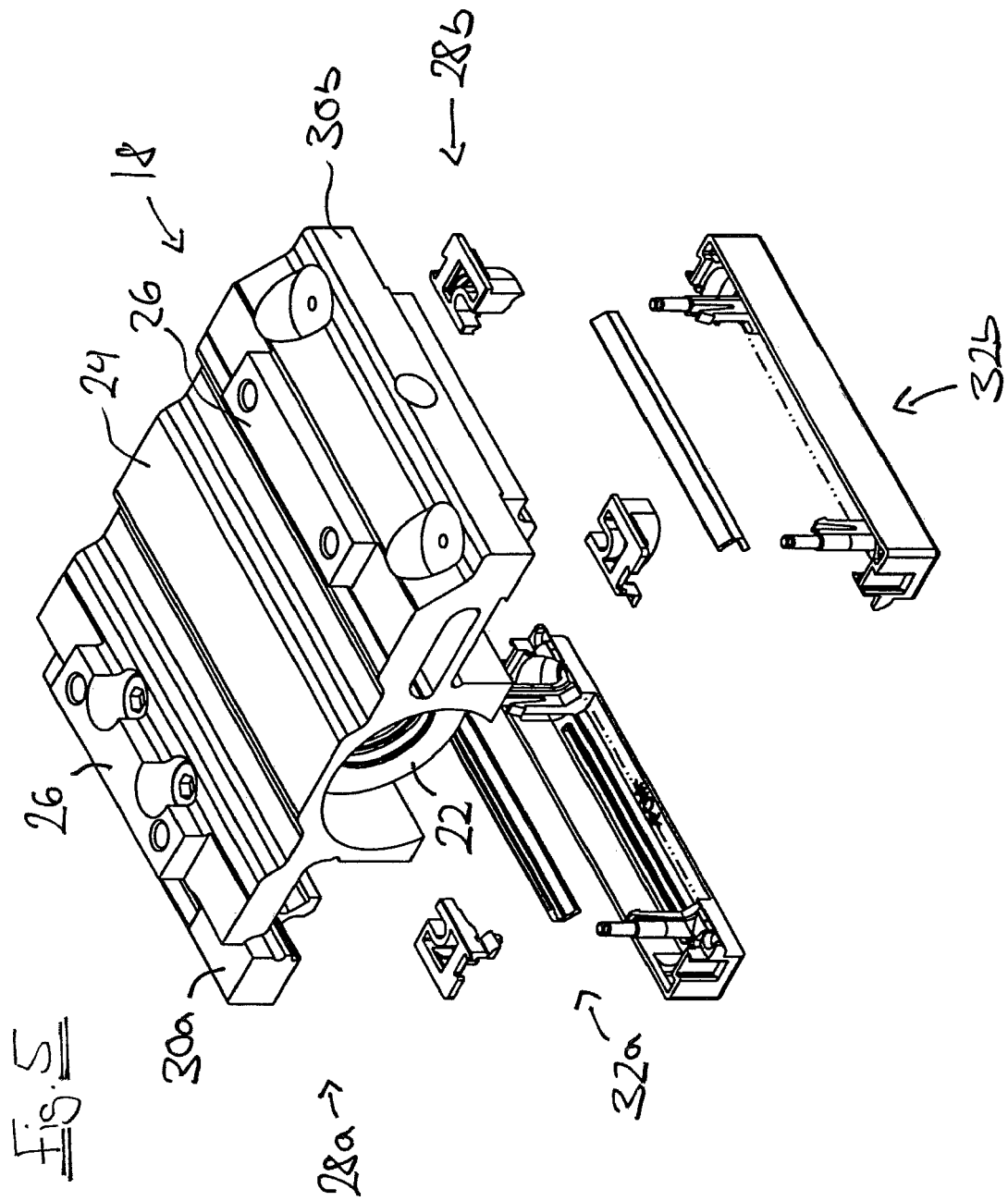
FIG. 5 is an exploded view of the guide carriage in FIG. 4 in accordance with the present invoice.

As shown in FIG. 3, with the embodiment of the present invention shown, several knee joints 38 are provided in the longitudinal direction of guide rail 14a, which are separated from each other via milled-out sections 56. As a result, parallelism errors in the tracks of guide carriage 18 can be compensated by adjusting the preload individually on each separate knee joint 38.

With the embodiment of the present invention shown, guide carriage 18 is guided on the outside of particular guide rails 14a, 14b, so that preload-adjustment device 36 is designed necessarily such that adjustment screw 54 pulls engagement part 52 of knee joint 38 upward in order to increase a preload between leg 28a and associated guide rail 14a. It is also feasible, however, that the legs of guide carriage are guided on the inside of associated guide rails, and the adjustment screw of an inventive preload-adjustment device of this type presses an engagement part of a knee joint downward in order to increase the preload of the leg against the guide rail.

It is also feasible that, instead of knee joint 38 shown here, only first rod 40 and engagement part 52 are provided, and second rod 44 is eliminated. A system of this type also has the inventive advantage of longer displacement paths and short preload paths, but it is not as stable and stiff as preferred knee joint 38.

It will be understood that each of the elements described above, or two or more together, may also find a useful application in other types of constructions differing from the type described above.

While the invention has been illustrated and described as embodied in a linear guide device with preload-adjustment device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A linear guide device, comprising a guide rail system with at least one guide rail; a guide carriage guided on said guide rail system in a guidance direction and including a base unit and legs which partially enclose said guide rail system, said guide carriage being provided with at least one preload-adjustment device via which a preload of said legs of guide carriage against said guide rail system is adjustable, said preload-adjustment device including at least one first rod having one end hingedly mounted on one of said legs of said guide carriage and the other end displaceable in a displacement direction; and a displacement device for displacing said other end of said preload-adjustment device in the displacement direction, wherein said displacement device includes a screw which bears against an element selected from the group consisting of said base unit of said guide carriage and an engagement part, and engages in a thread formed in an element selected from the group consisting of said engagement part and said base unit of said guide carriage, and further comprising at least one second rod provided between said engagement part and said base unit and forming a knee joint together with said at least one first rod and said engagement part.

2. A linear guide device as defined in claim 1, wherein said at least one first rod extends at an angle of substantially from 0° to 45° relative to a transverse direction of said guide rail system orthogonally to said guidance direction.

3. A linear guide device as defined in claim 1, wherein said adjustment device includes an engagement part on which said other end of said at least one first rod is hingedly mounted.

4. A linear guide device as defined in claim 1, wherein at least one element selected from the group consisting of said at least one first rod, said at least one second rod, said engagement part and a combination thereof, is formed integral with said guide carriage.

5. A linear guide device as defined in claim 1; and further comprising joint means including hinge joints provided between two elements selected from the group consisting of an engagement part and said at least one first rod, and said at least one first rod and said leg or said base unit of said guide carriage, and formed via material reduction.

6. A linear guide device as defined in claim 1, wherein said guide rail system includes a second guide rail so that said guide rail system has two guide rails.

7. A linear guide device as defined in claim 6, wherein said at least one preload-adjustment device is assigned to only one of said guide rails.

8. A linear guide device as defined in claim 1; and further comprising another preload-adjustment device, so that at least two preload-adjustment device are provided and separated in a longitudinal direction of said guide rail system and assigned to a same leg of said guide carriage.

9. A linear guide device as defined in claim 1; and further comprising at least one rolling element circuit through which said legs are engaged with said guide rail system.

* * * * *